United States Patent
Kim

(10) Patent No.: US 10,397,477 B2
(45) Date of Patent: Aug. 27, 2019

(54) THREE-DIMENSIONAL STUDIO SYSTEM

(71) Applicant: Je Hyung Kim, Seoul (KR)

(72) Inventor: Je Hyung Kim, Seoul (KR)

(*) Notice: Subject to any disclaimer, the term of this patent is extended or adjusted under 35 U.S.C. 154(b) by 0 days.

(21) Appl. No.: 15/751,949

(22) PCT Filed: Aug. 5, 2016

(86) PCT No.: PCT/KR2016/008651
§ 371 (c)(1),
(2) Date: Feb. 12, 2018

(87) PCT Pub. No.: WO2017/026751
PCT Pub. Date: Feb. 16, 2017

(65) Prior Publication Data
US 2018/0234627 A1 Aug. 16, 2018

(30) Foreign Application Priority Data
Aug. 10, 2015 (KR) .......... 10-2015-0112460

(51) Int. Cl.
*H04N 9/04* (2006.01)
*H04N 5/232* (2006.01)
(Continued)

(52) U.S. Cl.
CPC ....... *H04N 5/23238* (2013.01); *G01B 11/245* (2013.01); *H04N 5/222* (2013.01); *H04N 5/232* (2013.01); *H04N 5/23203* (2013.01); *H04N 5/23232* (2013.01); *H04N 5/23277* (2013.01); *H04N 5/247* (2013.01); *G01B 2210/52* (2013.01)

(58) Field of Classification Search
CPC ............... H04N 5/23238; H04N 5/232; H04N 5/23203; H04N 5/23277; H04N 5/23232; H04N 5/247; H04N 5/222; G01B 11/245; G01B 2210/52
See application file for complete search history.

(56) References Cited

U.S. PATENT DOCUMENTS

2017/0251143 A1* 8/2017 Peruch ................... G06T 17/00
2018/0350136 A1* 12/2018 Rowley ................ G06T 15/205

FOREIGN PATENT DOCUMENTS

JP 2005-252831 9/2005
JP 2010-154052 7/2010
(Continued)

OTHER PUBLICATIONS

International Search Report for International Application No. PCT/KR2016/008651, dated Oct. 31, 2016.

*Primary Examiner* — Howard D Brown, Jr.
(74) *Attorney, Agent, or Firm* — Kile Park Reed & Houtteman PLLC

(57) ABSTRACT

A three-dimensional studio system includes a booth including camera modules each including a camera and a driving device and sensor modules; a database configured to store camera setting data and driving setting data; a booth control unit configured to transfer a photographed image of the camera to an external image processing device, and provide a camera control signal and a driving control signal to the camera and the driving device, respectively; and a statistical analysis unit configured to back up the camera setting data and the driving setting data in the database by reflecting a rendering correction value.

26 Claims, 10 Drawing Sheets

(51) Int. Cl.
  *H04N 5/222* (2006.01)
  *H04N 5/247* (2006.01)
  *G01B 11/245* (2006.01)

(56) References Cited

FOREIGN PATENT DOCUMENTS

| | | |
|---|---|---|
| JP | 2010-154306 | 7/2010 |
| JP | 2015-026931 | 2/2015 |
| KR | 2003-0016452 | 3/2003 |
| KR | 10-2007-0020764 | 2/2007 |
| KR | 10-2007-0049109 | 5/2007 |

* cited by examiner (a)

(b)

(c)

THREE-DIMENSIONAL STUDIO SYSTEM

TECHNICAL FIELD

Various embodiments generally relate to a three-dimensional (hereinafter, referred to as "3D") studio system, and, more particularly, to a 3D studio system which controls a camera and a background installed in a booth for three-dimensionally photographing a subject.

BACKGROUND ART

Recently, as a 3D printer is developed and distributed, the necessity and use of a 3D image for a real object such as an article or a person are increasing.

A high-quality 3D image for a real object may be obtained by 3D photographing using a 3D studio.

In the 3D studio, there are installed a plurality of cameras which are disposed by being dispersed around a subject, a plurality of illumination devices for illuminating the subject and a background which is used in photographing the subject.

In the 3D studio, in order for 3D-photographing the subject to obtain a high-quality 3D image, each camera should be set to a different setting value for photographing in conformity with the characteristics of the subject.

In detail, the respective cameras have different directions, positions and distances with respect to the subject. Therefore, the respective cameras should be controlled differently in terms of exposure or zoom in consideration of the directions, positions and distances.

Further, the background should be selected in consideration of the contrast and color of the subject so that the shape and appearance of the subject are well-defined.

However, it is very difficult to set all elements constituting the 3D studio to have optimum values in consideration of the characteristics of the object. Further, finding the optimum values of the respective elements of the 3D studio to obtain a high-quality 3D image of the subject requires a lot of time and effort.

In particular, in the case where the subject is changed or the state of the subject such as a pose, a shape, a position or a color is changed, difficulties are caused in that the photographing environment of the 3D studio should be set again in conformity with a changed subject or the changed state of the subject.

Various techniques for easily photographing a subject in a 3D studio have been developed in order to solve the above difficulties, and an example thereof is disclosed in Korean Unexamined Patent Publication No. 2003-0016452.

DISCLOSURE

Technical Problem

Various embodiments are directed to a 3D studio system capable of sensing at least one of a subject and a background for 3D photographing, and easily setting a photographing environment by using data corresponding to a sensing result among data set in advance.

Various embodiments are directed to a 3D studio system capable of sensing the shape of a subject, the position of the subject, the distance of the subject, the black and white state of the subject and the color state of the subject, and controlling a photographing environment for 3D-photographing the subject, by performing control of a camera and control of camera driving through using data corresponding to a sensing result.

Various embodiments are directed to a 3D studio system capable of storing camera setting data for controlling a camera and driving setting data for adjusting the position and direction of the camera, to have a correlation with a sensing signal, and controlling a photographing environment for 3D-photographing a subject, by using data corresponding to a sensing signal obtained by sensing the subject.

Various embodiments are directed to a 3D studio system capable of controlling each of cameras, disposed by being dispersed around a subject to obtain a 3D image in an image process, to photograph an image including an overlapping area of a predetermined range with at least one adjacent camera.

Various embodiments are directed to a 3D studio system capable of controlling a background for a subject, to be changed in correspondence to a sensing result.

Various embodiments are directed to a 3D studio system capable of providing optimal data having a correlation with a sensing signal to control a photographing environment, by backing up, in a database, data corresponding to a result of sensing a subject and data on which a rendering correction value obtained in the process of performing an image process for a 3D-photographed image is reflected, to have a correlation with the sensing signal.

Various embodiments are directed to a 3D studio system capable of providing a photographing environment optimized for 3D photographing, by giving a correlation of a statistical weight with a sensing signal, to data backed up in a database.

Various embodiments are directed to a 3D studio system capable of providing a photographing environment optimized for 3D photographing, by sampling a rendering correction value determined to be valid in an image process and by backing up, in a database, data sampled through a data statisticalization process of sampling data by using the sampled rendering correction value, to have a correlation with a sensing signal.

Technical Solution

In an embodiment, a three-dimensional studio system may include: a booth including camera modules each including a camera which photographs a subject in response to a camera control signal and a driving device which adjusts a position and a direction of the camera in response to a driving control signal and sensor modules each of which provides a sensing signal obtained by sensing the subject, the camera modules and the sensor modules being disposed by being spatially dispersed around the subject; a database configured to store camera setting data for controlling the camera and driving setting data for adjusting the position and the direction of the camera, to have a correlation with the sensing signal; a booth control unit configured to transfer a photographed image of the camera to an external image processing device, select the camera setting data and the driving setting data for the sensing signal of the sensor module in the database, and provide the camera control signal and the driving control signal corresponding to the camera setting data and the driving setting data, to the camera and the driving device, respectively; and a statistical analysis unit configured to receive the sensing signal and the camera setting data and the driving setting data selected for the sensing signal, from the booth control unit, receive a rendering correction value obtained in a course of performing an image process, from the image processing device, and back up the camera setting data and the driving setting data in the database by reflecting the rendering correction value, to have a correlation with the sensing signal.

Advantageous Effects

According to the embodiment, since a photographing environment may be easily set by sensing a subject, it is possible to save the time and effort required for setting a photographing environment for 3D photographing.

Also, according to the embodiment, by sensing the various characteristics of a subject, control of a camera and control of camera driving may be controlled to an optimal state for 3D-photographing of the subject.

Further, according to the embodiment, since camera setting data for controlling a camera and driving setting data for adjusting the position and direction of the camera are stored to have a correlation with a sensing signal, it is possible to control a photographing environment for 3D-photographing of a subject, by using optimal data corresponding to a result of sensing the subject.

Moreover, according to the embodiment, as a sensing signal and data are stored in a database to have a correlation, optimal data for setting a 3D photographing environment may be provided according to a statistical analysis.

In addition, according to the embodiment, since a background for a subject may be changed in correspondence to a sensing result, an optimal background for the subject may be provided for 3D photographing.

MODE FOR DISCLOSURE

Figure 1:
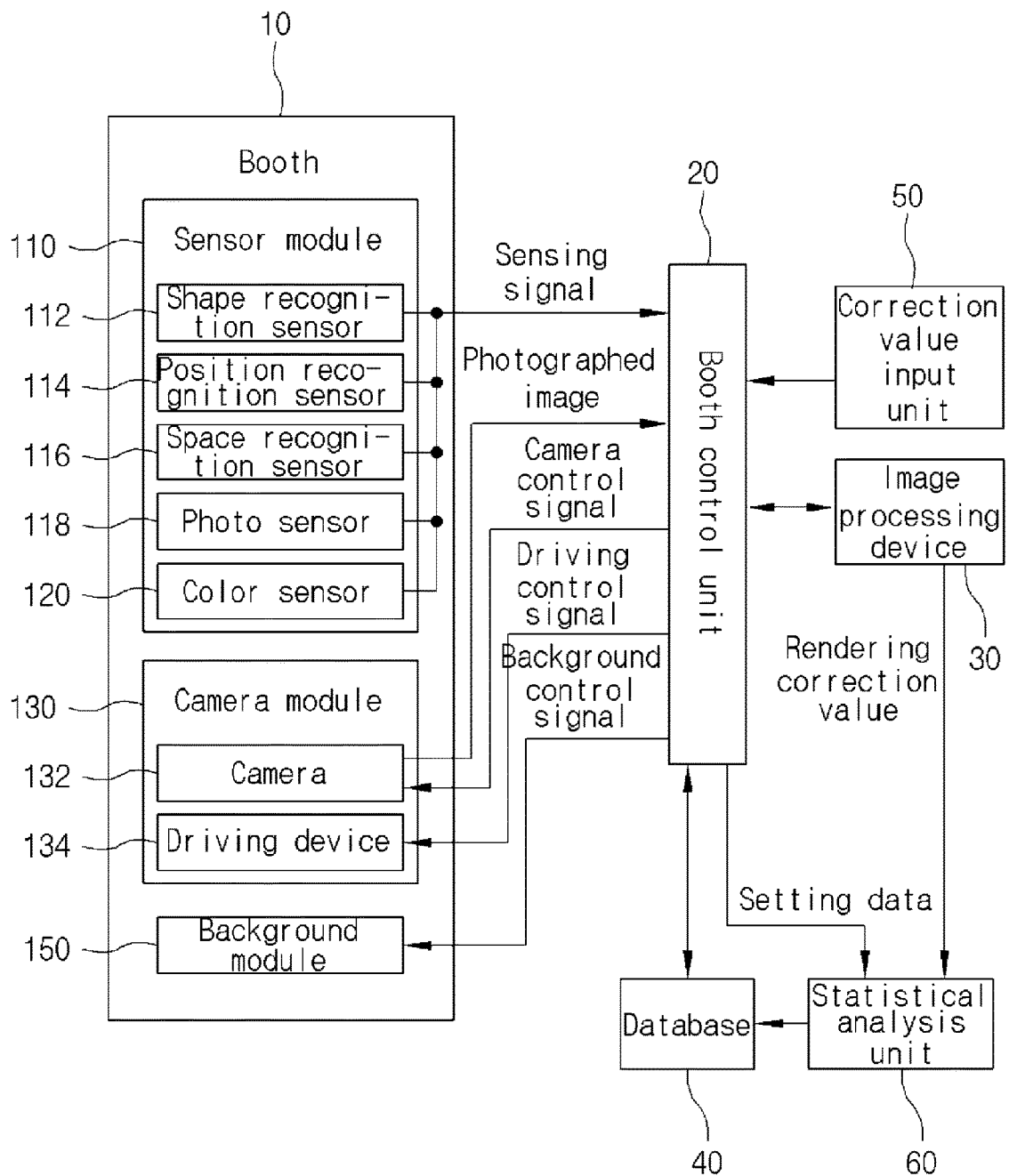
FIG. 1 is a block diagram illustrating a representation of an example of a 3D studio system in accordance with an embodiment.

Hereinafter, embodiments of the present disclosure will be described in detail with reference to the accompanying drawings. The terms used herein and in the claims shall not be construed by being limited to general or dictionary meanings and shall be interpreted based on the meanings and concepts corresponding to technical aspects of the present disclosure.

Embodiments described herein and configurations illustrated in the drawings are preferred embodiments of the present disclosure, and, because they do not represent all of the technical features of the present disclosure, there may be various equivalents and modifications that can be made thereto at the time of the present application.

Referring to FIG. 1, a 3D studio system in accordance with an embodiment includes a booth 10, a booth control unit 20, a database 40, a correction value input unit 50 and a statistical analysis unit 60.

Among the components, the booth control unit 20 is configured to transfer the photographed image of a camera 132 of the booth 10 to an external image processing device 30.

The image processing device 30 means a device which receives the photographed images photographed by the cameras 132 of the booth 10, through the booth control unit 20, performs 3D rendering by using the photographed images and generates a 3D image file for a subject. The 3D image file means an electronic information which may be implemented as a 3D image by using a designated application.

The image processing device 30 may generate a rendering correction value for securing a high-quality photographed image for the subject, as a result of image processing. The rendering correction value will be described later.

The booth 10 includes a sensor module 110, a camera module 130 and a background module 150, and, while not shown, may further include an illumination module.

A plurality of sensor modules 110 and a plurality of camera modules 130 are configured and are disposed by being spatially dispersed around the subject. A method in which the plurality of sensor modules 110 and the plurality of camera modules 130 are disposed by being spatially dispersed will be described later.

Each sensor module 110 provides a sensing signal obtained by sensing the subject, to the booth control unit 20. Each sensor module 110 is configured to include at least one of a shape recognition sensor 112 which recognizes the shape of the subject, a position recognition sensor 114 which recognizes the position of the subject, a space recognition sensor 116 which recognizes the distance of the subject, a photo sensor 118 which senses the black and white of the subject and a color sensor 120 which recognizes the color of the subject.

The sensing signal outputted from the sensor module 110 may be defined as including at least one of the outputs of the shape recognition sensor 112, the position recognition sensor 114, the space recognition sensor 116, the photo sensor 118 and the color sensor 120. The sensing values of the respective sensors may be determined as elements constituting the sensing signal.

The shape recognition sensor 112 may be configured to have a light receiving structure which senses the light reflected from the subject, and senses the shape of the subject such as a pose or a volume. The position recognition sensor 114 may be configured by using a high frequency sensor for recognizing the height of the subject. The space recognition sensor 116 may be configured by using a laser sensor, and recognizes the distance of the subject. The photo sensor 118 is to recognize the black and white of the subject, that is, the contrast of the subject. The color sensor 120 is to recognize the color of the subject. The photo sensor 118 and the color sensor 120 may be configured by using sensors having single-layered or multi-layered CMOS pixels.

The sensor module 110 may be configured to recognize the black and white or color of not only the subject but also a background and provide a sensing signal corresponding thereto.

To this end, the sensor module 10 may additionally include a photo sensor and a color sensor. The photo sensor recognizes the black and white, that is, the contrast, of the background, and the color sensor recognizes the color of the background.

Photo sensors and color sensors for sensing black and white and color of the subject and the background may be configured by using one photo sensor 118 and one color sensor 120.

By the above-described configuration, the sensor module 110 provides the sensing signal including the sensing value provided from at least one among the shape recognition sensor 112, the position recognition sensor 114, the space recognition sensor 116, the photo sensor 118 and the color sensor 120, to the booth control unit 20.

Each sensor module 110 may be configured in correspondence to each camera module 130 or in correspondence to a plurality of camera modules 130. Sensor modules 110 may be disposed by being spatially dispersed in a variety of ways together with camera modules 130 in consideration of a sensing method and a sensing target.

Each camera module 130 includes a camera 132 which photographs the subject in correspondence to a camera control signal and a driving device 134 which adjusts the position and direction of the camera 132 in correspondence to a driving control signal. The camera 132 provides a photographed image to the booth control unit 20, and the photographing operation of the camera 132 and the driving state of the driving device 134 are controlled by the booth control unit 20.

The database 40 stores a sensing signal, camera setting data for controlling the camera 132, driving setting data for adjusting the position and direction of the camera 132 and background control data for determining a background for a subject. In the database 40, there are stored camera setting data, driving setting data and background control data of various values capable of being matched with optimal values to specific sensing signals. The sensing signals, the camera setting data, the driving setting data and the background control data capable of being matched with the optimal values to one another may be defined as having a correlation with one another. The respective values included in the camera setting data, the driving setting data and the background control data may have a correlation with a plurality of sensing signals, and also, each value of a sensing signal may have a correlation with a plurality of camera setting data, a plurality of driving setting data and a plurality of background control data which are updated. In this way, the correlation may be defined as having a relationship capable of using in selection.

The background module 150 receives a background control signal from the booth control unit 20, and provides a background for the subject corresponding to the background control signal. For instance, the background module 150 may be configured to change a background to any one of a black, a white and at least one color in correspondence to the background control signal.

The booth control unit 20 transfers the photographed image of the camera 132 to the external image processing device 30, selects camera setting data and driving setting data which have a correlation with the sensing signal of the sensor module 110, from the database 40, and provides a camera control signal and a driving control signal corresponding to the selected camera setting data and driving setting data, to the camera 132 and the driving device 134, respectively.

Moreover, the booth control unit 20 selects background control data having a correlation with the sensing signal, from the database 40, and provides a background control signal corresponding to the selected background control data, to the background module 150.

The correction value input unit 50 may be configured to input a correction value to the booth control unit 20. The correction value input unit 50 provides a correction value for correction of camera setting data, driving setting data and background control data, by an input from a user. The correction value input unit 50 may include an input device for providing a correction value, such as a keyboard or a touch pad, and a display device for displaying currently set values, a correction value, etc. The correction value inputted to the correction value input unit 50 may be determined passively by the user or may be determined by using a separate device.

The booth control unit 20 controls at least one of the shutter, the iris, the sensitivity and the zoom of the camera 132, and controls the zoom of the camera 132 to secure a photographed image including a predetermined range of overlapping area with one or more other cameras adjacent thereto.

The booth control unit 20 provides a camera control signal and a driving control signal for adjusting the zoom of the camera 132, the position of the camera 132 and the direction of the camera 132, to the camera 132 and the driving device 134, to allow the camera 132 to secure a photographed image including the predetermined range of overlapping area with one or more other cameras adjacent thereto.

The statistical analysis unit 60 receives a sensing signal and camera setting data, driving setting data and background control data selected by the sensing signal, from the booth control unit 20, and receives a rendering correction value obtained in the process of performing an image process, from the image processing device 30.

The statistical analysis unit 60 corrects the camera setting data, driving setting data and background control data provided from the booth control unit 20, by using the rendering correction value, and backs up the corrected data in the database 40.

In order for history management, the statistical analysis unit 60 backs up the camera setting data, driving setting data and background control data on which a rendering correction value is reflected, in the database 40, separately from camera setting data, driving setting data and background control data before reflecting the rendering correction value, to have a correlation with the same sensing signal.

The statistical analysis unit 60 defines a sensing signal to have a statistical weight for a specific element included in the sensing signal, and backs up camera setting data, driving setting data and background control data, in the database 40, to have a high correlation with the sensing signal having the weight.

In detail, in the case where a correction value for the sensing value of the position recognition sensor 114 is statistically smallest among the elements included in a sensing signal, the corresponding sensing value of the position recognition sensor 114 may be given high reliability. The statistical analysis unit 60 defines the sensing signal to have statistical weights for elements having small correction values statistically, and backs up camera setting data, driving setting data and background control data on which the correction values are reflected, in the database 40, to have a high correlation with the sensing signal having the weights.

The data backed up in the database 40 in this way may be preferentially selected when the booth control unit 20 selects camera setting data, driving setting data and background control data corresponding to the sensing signal provided from the sensor module 110 of the booth 10. Therefore, the booth control unit 20 may perform setting for 3D photographing, by using camera setting data, driving setting data and background control data with reliability.

The statistical analysis unit 60 distinguishes valid and invalid rendering correction values and samples a valid rendering correction value. The statistical analysis unit 60 samples camera setting data, driving setting data and background control data by reflecting the valid rendering correction value on camera setting data, driving setting data and background control data. The statistical analysis unit 60 backs up the sampled camera setting data, driving setting data and background control data, in the database 40, to have a correlation with a sensing signal.

In detail, the image processing device 30 provides a rendering correction value for each of the photographed images photographed by the camera 132, to the statistical analysis unit 60. The image processing device 30 may provide an information that a rendering correction value for a photographed image used in generating a 3D image among the rendering correction values for the respective photographed images is valid, and may provide an information that a rendering correction value for a photographed image not used in generating a 3D image among the rendering correction values for the respective photographed images is invalid. For instance, an unnecessary photographed image and a photographed image having an insufficient overlapping area among photographed images are not used in generating a 3D image. Therefore, rendering correction values for these photographed images may be determined to be invalid.

The statistical analysis unit 60 samples camera setting data, driving setting data and background control data by reflecting a valid rendering correction value among the rendering correction values provided as described above, on camera setting data, driving setting data and background control data. The statistical analysis unit 60 backs up the sampled camera setting data, driving setting data and background control data, in the database 40, to have a correlation with a sensing signal. The sampled camera setting data, driving setting data and background control data may be used in setting of a camera module 130 which has photographed a photographed image not used in generating a 3D image.

By the configuration described above with reference to FIG. 1, in the case where it is necessary to photograph a subject in the booth 10, the booth control unit 20 selects camera setting data, driving setting data and background control data to be provided to respective cameras 132 in correspondence to the sensing signals of the sensor modules 110 installed in the booth 10, and provides camera control signals, driving control signals and background control signals corresponding to the camera setting data, driving setting data and background control data, to the respective cameras 132 of the booth 10.

The cameras 132 installed in the booth 10 may be set in the shutters, irises, the sensitivities and the zooms thereof by the camera control signals, and the driving devices 134 may control the positions and directions of the cameras 132 mounted thereto by the driving control signals, and the background module 150 may change a background by the background control signals.

After being set as described above, the cameras 132 may simultaneously photograph a subject by the control of the booth control unit 20.

The photographed images photographed by the cameras 132 are transferred to the image processing device 30 through the booth control unit 20.

A 3D image is generated by performing a rendering process using photographed images by the driving of a program installed in the image processing device 30 for an image processing process and a manual work of an operator. If it is determined that correction is necessary for some or all photographed images during the process of generating a 3D image using photographed images, a rendering correction value for correction may be generated. The image processing device 30 provides the rendering correction value to the statistical analysis unit 60.

The statistical analysis unit 60 receives the setting data of the booth control unit 20 and the rendering correction value of the image processing device 30, corrects the camera setting data, driving setting data and background control data provided from the booth control unit 20, by using the rendering correction value, and backs up the corrected data in the database 40.

In the case where the booth 10 and the booth control unit 20 are driven again to obtain a corrected photographed image, the booth control unit 20 may provide the camera setting data, driving setting data and background control data to which the rendering correction value is applied in correspondence to a sensing signal, to the booth 10.

As a consequence, the 3D studio system in accordance with the embodiment may secure an optimal photographed image corresponding to a subject, and as a result, may generate a high-quality 3D image.

Detailed descriptions for the booth 10 will be made below with reference to FIG. 2.

In the booth 10, camera modules 130 are spatially dispersed. For example, the camera modules 130 may be disposed by being spatially dispersed to form a cylindrical space around a subject as shown in FIG. 2. For another example, the camera modules 130 may be disposed by being spatially dispersed to form a dome-shaped space around a subject. Sensor modules 110 may also be disposed by being spatially dispersed in the same manner as the camera modules 130 are dispersed, to form a cylindrical space or a dome-shaped space. The fact that the camera modules 130 are disposed by being dispersed to form a cylindrical space or a dome-shaped space around a subject is nothing but a mere illustration of the present disclosure, and it is to be noted that the camera modules 130 may be disposed in a variety of ways with respect to a subject.

The booth 10 includes arrangement structures 170 and 172 for disposing the camera modules 130 to form a cylindrical space as described above. The arrangement structures 170 and 172 are disposed on a floor to form circles which have different diameters. The arrangement structures 170 and 172 are uniformly separated from each other by a predetermined distance, and guiders 182 which are disposed to extend radially and are separated from one another by a predetermined angle are coupled between the arrangement structures 170 and 172.

Horizontal moving parts 134a are installed on the guiders 182, respectively. The respective horizontal moving parts 134a may be driven to be moved in the horizontal direction along the guiders 182 to which they are coupled. That is to say, the guiders 182 guide the horizontal movement of the horizontal moving parts 134*a*, and the distances of the camera modules 130 with respect to the subject may be adjusted by the movement of the horizontal moving parts 134*a*.

Guiders 180 are vertically installed on the horizontal moving parts 134*a*, respectively. At least two camera modules 130 are dispersedly installed on each guider 180, and each guider 180 guides the upward and downward movement of the camera modules 130.

In the embodiment of the present disclosure, the guiders 180 which are vertically installed around a subject TS are disposed to define a cylindrical space, and at least two camera modules 130 are installed on each of the guiders 180 which form the cylindrical space. While the embodiment of FIG. 2 illustrates that 16 guiders 180 are installed and six camera modules 130 are installed on each guider 180, it is to be noted that the embodiment is not limited thereto and the number of the guiders 180 and the number of the camera modules 130 may be set variously.

Figure 2:
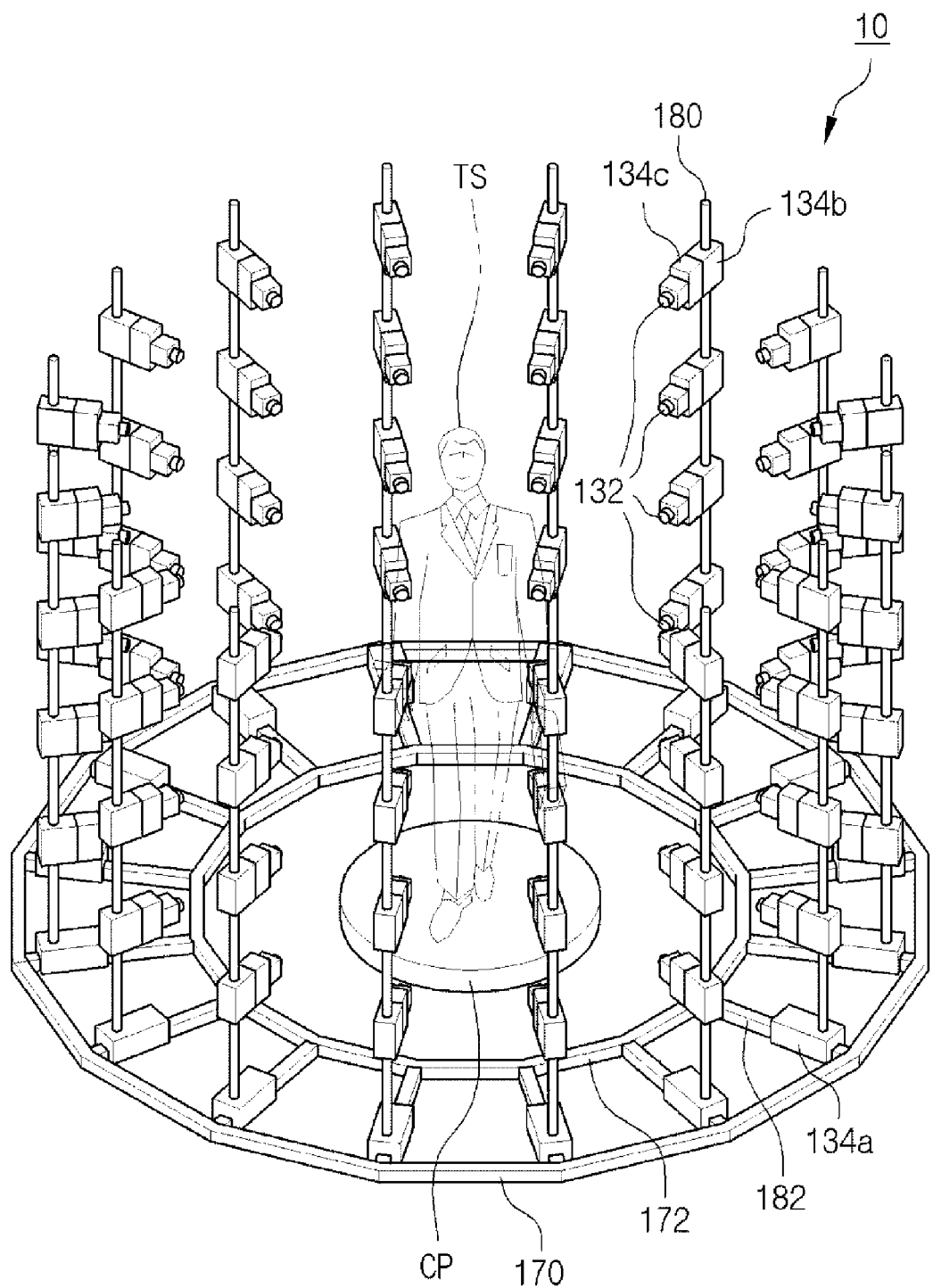
FIG. 2 is a perspective view illustrating a representation of an example of the booth shown in FIG. 1.

In each of the camera modules 130 installed on the guiders 180 of FIG. 2, the camera 132 and the driving device 134 are combined. The driving device 134 mounts the camera 132, and may be capable of upward and downward movement, horizontal rotation and vertical rotation. As at least one of the upward and downward movement, horizontal rotation and vertical rotation of the driving device 134 is controlled in response to a driving control signal, the position and direction of the camera 132 may be adjusted.

To this end, the driving device 134 is constructed to be moved upward and downward along the guider 180.

The driving device 134 may be explained as including a first driving part 134*c* which mounts the camera 132 and performs any one of horizontal rotation and vertical rotation in response to the driving control signal, a second driving part which mounts the first driving part 134*c* and performs the other of horizontal rotation and vertical rotation in response to the driving control signal and a third driving part which performs the upward and downward movement of the second driving part in response to the driving control signal. The second driving part and the third driving part may be constructed as a fourth driving part 134*b*.

Figure 3:
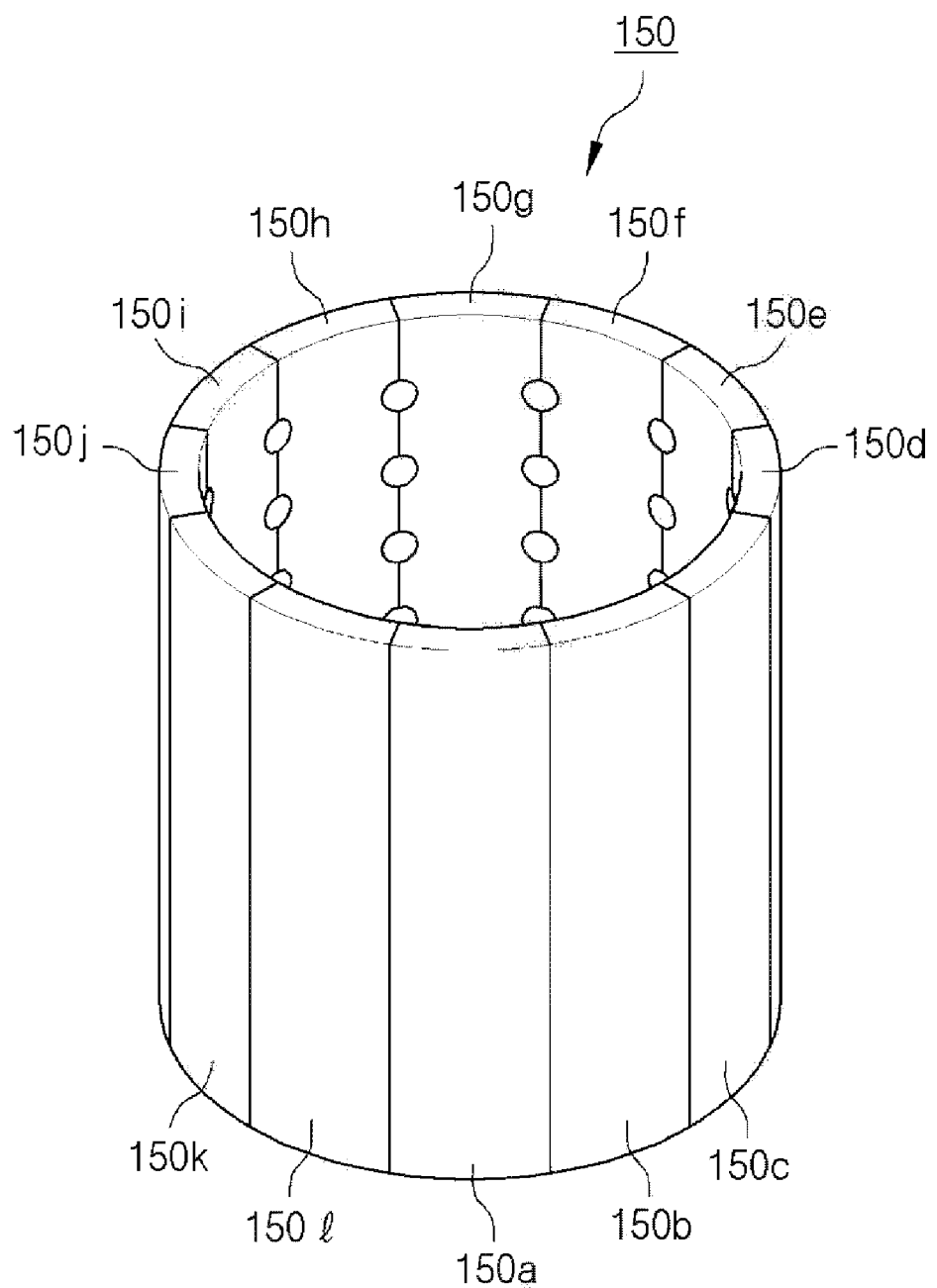
FIG. 3 is a partial perspective view illustrating a representation of an example of a camera module.

The embodiment of FIG. 3 illustrates that the horizontal moving part 134*a* is horizontally moved along the guider 182, the first driving part 134*c* is vertically rotated and the fourth driving part 134*b* is horizontally rotated and moved upward and downward. The horizontal moving part 134*a*, the first driving part 134*c* and the fourth driving part 134*b* are mounted with motors of which driving is controlled by the driving control signal.

By the above construction, the height of the camera module 130 is adjusted by the upward and downward movement of the fourth driving part 134*b*. The fourth driving part 134*b* is controlled to be moved upward in the case where the height of the subject TS is large, and is controlled to be moved downward in the case where the height of the subject TS is small.

Figure 4:
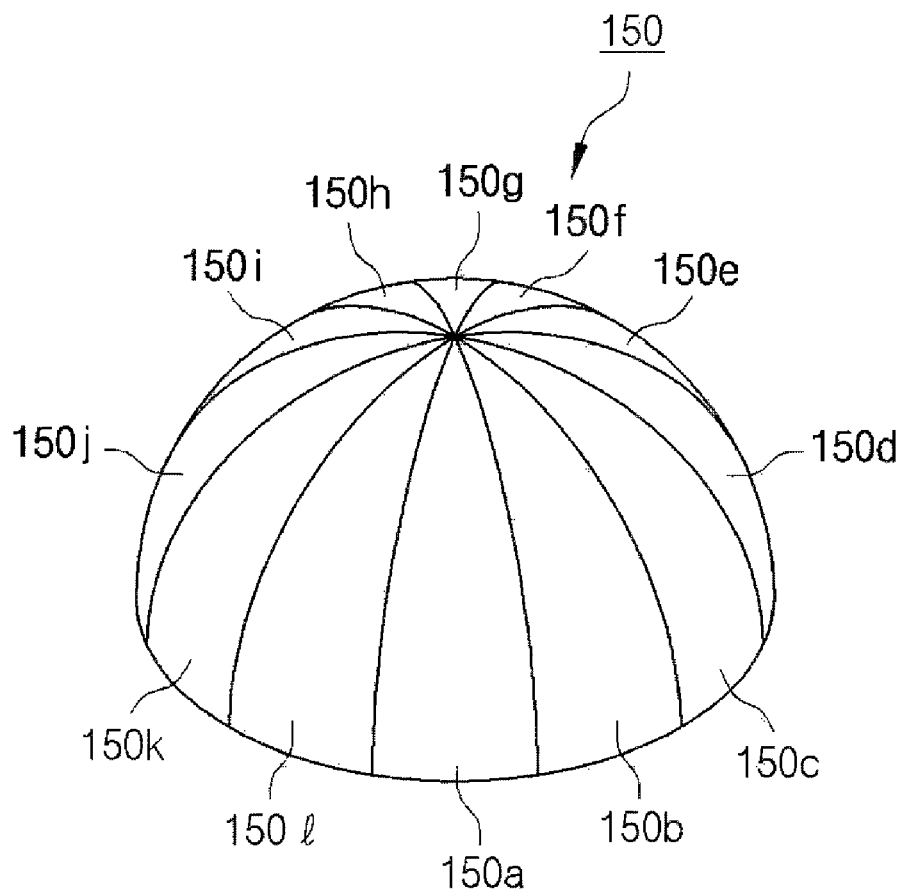
FIG. 4 is a perspective view illustrating a representation of an example of a cylinder-shaped background module which may be constructed in the booth of FIG. 1.

In the embodiment, in correspondence to that the camera modules 130 are disposed by being dispersed around the subject TS to form a cylindrical space, the background module 150 may be constructed as shown in FIG. 4. The camera modules 130 may be disposed in the background module 150.

The background module 150 of FIG. 4 which is constructed in a cylindrical shape includes a plurality of background cells 150*a* to 150*l*. The background cells 150*a* to 150*l* may be constructed by wall members which are separate from one another around the subject TS to extend by a predetermined angle in a circumferential direction. The background cells 150*a* to 150*l* may be constructed to be assembled with one another.

The background module 150 may be constructed to dispose at least some of the camera modules 130 or have a space in which cameras 132 may photograph the subject TS. In FIG. 4, circular spaces which are formed between the coupling portions of the background cells 150*a* to 150*l* of the background module 150 are illustrated as spaces for disposing at least some of the camera modules 130 or for allowing the cameras 132 to photograph the subject TS.

Figure 5:
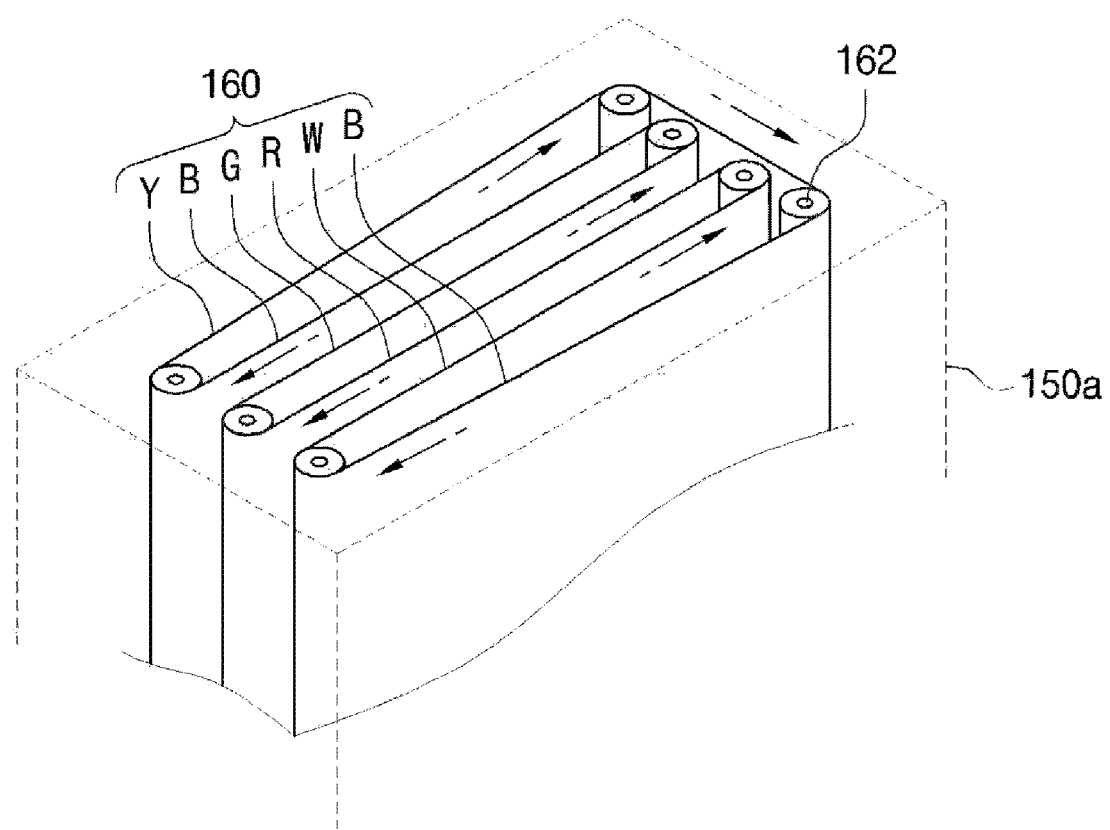
FIG. 5 is a perspective view illustrating a representation of an example of a dome-shaped background module which may be constructed in the booth of FIG. 1.

Further, in the embodiment, in correspondence to that the camera modules 130 are disposed by being dispersed around a subject to form a dome-shaped space, the background module 150 may be constructed as shown in FIG. 5. The background module 150 of FIG. 5 which is constructed in a dome shape includes a plurality of background cells 150*a* to 150*l* which are uniformly split. The background cells 150*a* to 150*l* may be constructed to be assembled with one another.

The background module 150 may change a background to any one of black, white and one or more colors in response to a background control signal. The respective background cells 150*a* to 150*l* may be constructed to emit light by using LEDs as light sources, and may express various colors such as black B, white W, red R, green G, blue B and yellow Y. In this case, the background cells 150*a* to 150*l* may be constructed such that emission colors are determined by the emission colors of the light sources thereof or by combined colors.

The background color of the background module 150 may be determined in consideration of the subject TS. If the subject TS is white, a background may be determined to be black, and if the subject TS is black, a background may be determined to be white. If the subject TS has a color, the complementary color of the color of the subject TS may be determined as a background.

Each of the background cells 150*a* to 150*l* of the background module 150 may be configured to include screens capable of representing black, white and one or more colors, respectively, and to selectively represent a background by driving the screens in response to a background control signal.

The screens of the background cells 150*a* to 150*l* may be constructed to be driven vertically, horizontally or in any one direction.

Figure 6:
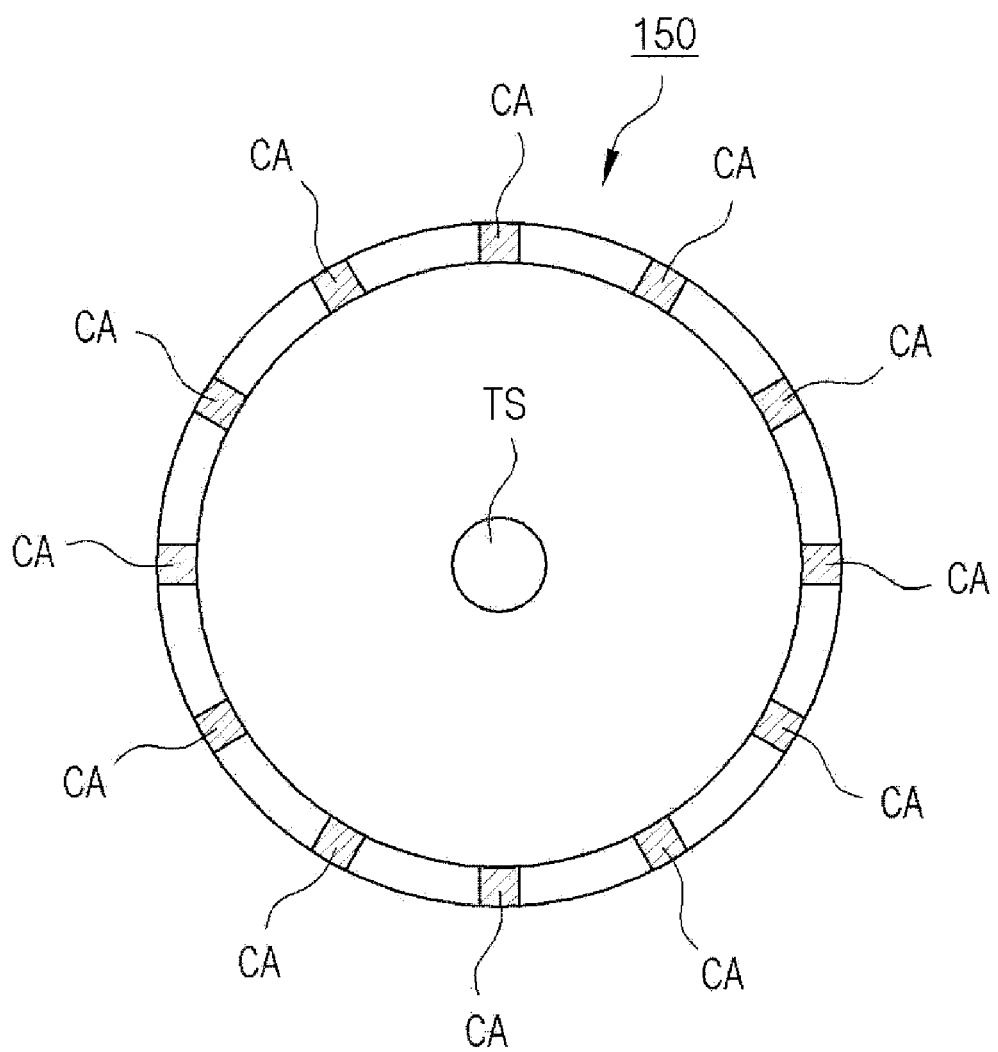
FIG. 6 is a view illustrating a representation of an example of a background cell for changing a background.

FIG. 6 illustrates that the screens of each of the background cells 150*a* to 150*l* are driven horizontally. Screens 160 are driven by the rotation of rollers 162.

Figure 7:
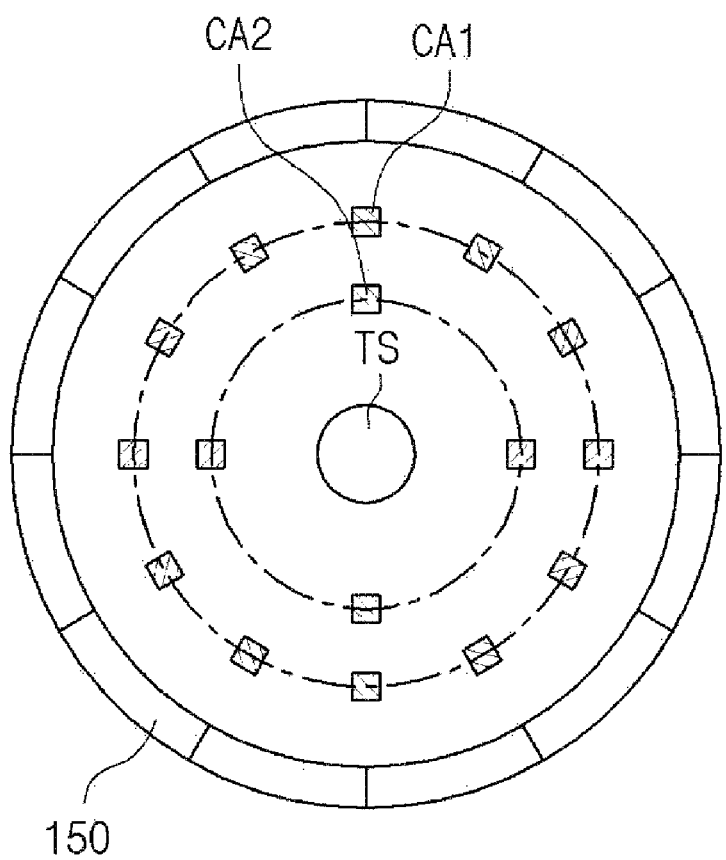
FIG. 7 is a plan view illustrating a representation of an example of cameras which are installed on a background module.

In the case where the background module 150 is constructed as shown in FIG. 4 or 5, camera modules 130 may be partially mounted to or built in the background module 150 as shown in FIG. 7. In FIG. 7, CA indicates a position where each camera module 130 is disposed in a plane.

Figure 8:
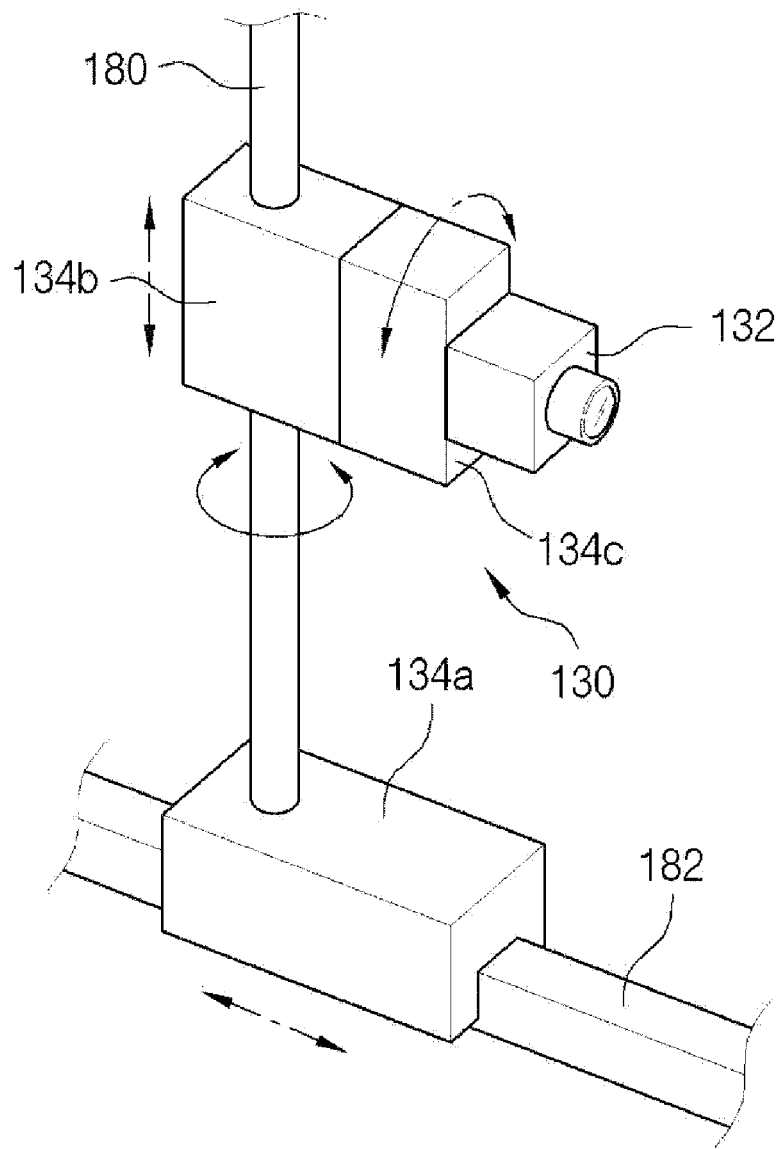
FIG. 8 is a representation of an example of a plan view to assist in the explanation of a method for disposing cameras.

Also, in the embodiment of the present disclosure, camera modules 130 may be disposed by being dispersed on at least two disposition lines which are positioned around the subject TS on the same plane as shown in FIG. 8.

FIG. 8 corresponds to a case where additional camera modules CA2 are arranged inside camera modules CA1 which are disposed basically, when an additional photographed image for the lower part or the upper part of the subject TS is needed.

Further, in the embodiment of the present disclosure, camera modules 130 may be disposed by being dispersed on at least two disposition lines which are positioned around the subject TS on different planes.

In the embodiment of the present disclosure, in order to realize a 3D image, each camera module 130 may be controlled to include a predetermined range of overlapping area with one or more other camera modules 130 adjacent thereto.

Figure 9:
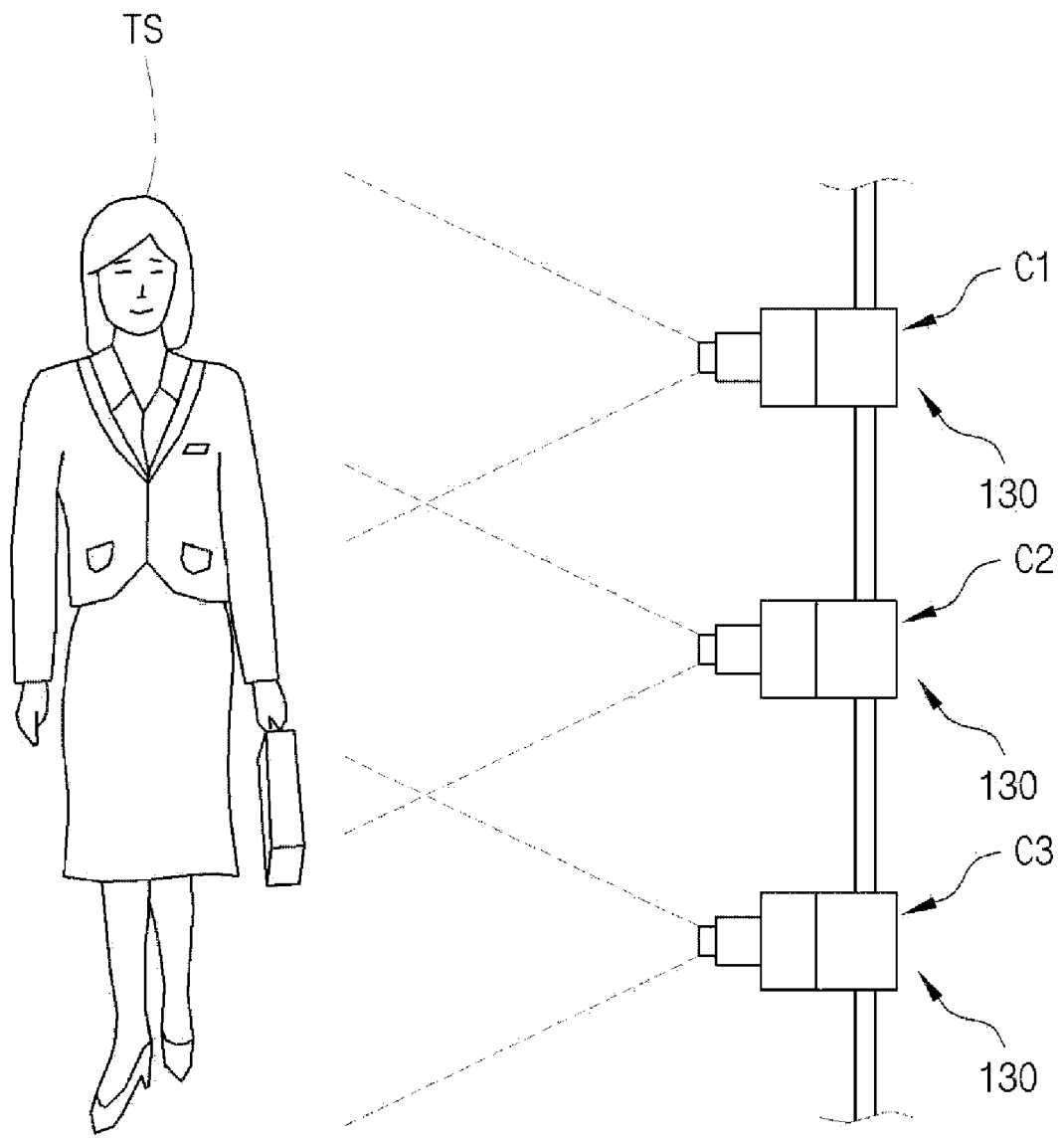
FIG. 9 is a representation of an example of a view to assist in the explanation of photographing to have an overlapping area.

Referring to FIG. 9, the camera module 130 of a C2 position should photograph the subject TS to have overlapping areas with the photographed images of C1 and C3 positions.

Figure 10:
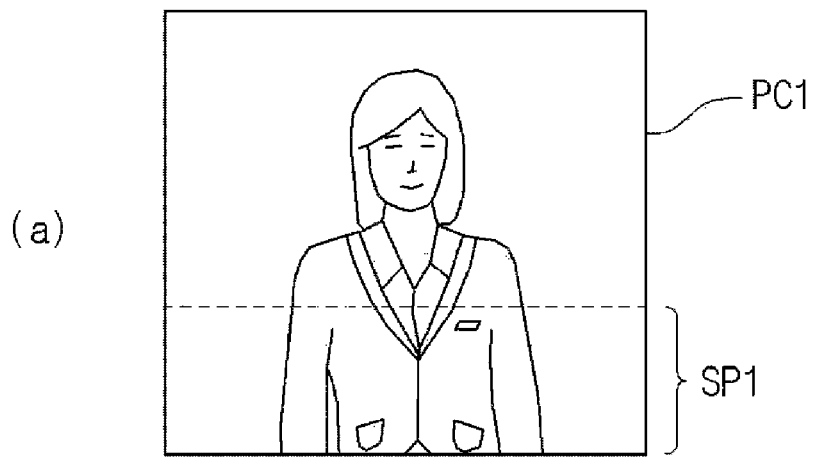
FIG. 10 is a representation of an example of a view to assist in the explanation of an image photographed by adjacent cameras.
Figure 10:
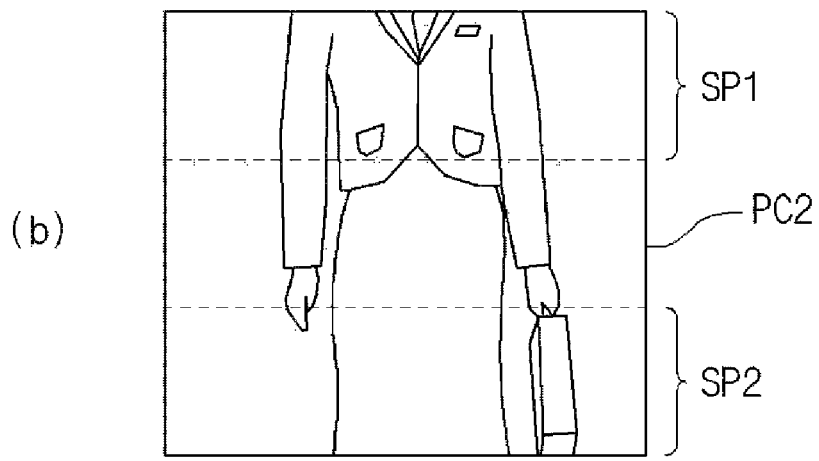
Figure 10:
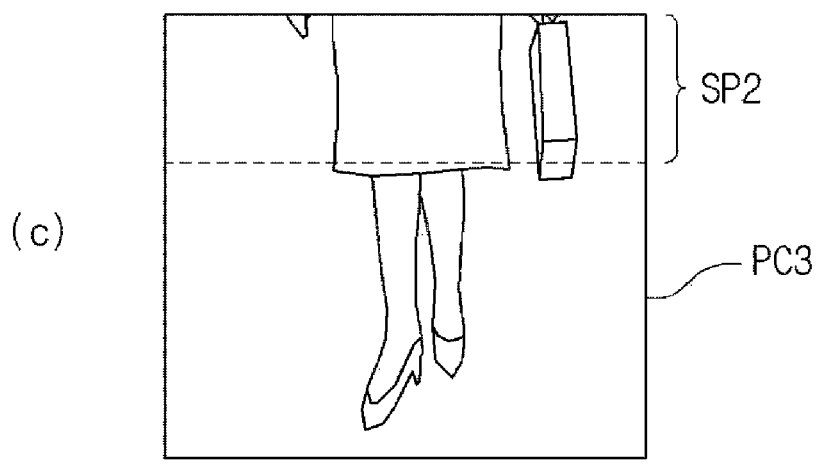

In other words, the photographed images of respective positions should have overlapping areas SP1 and SP2 of the predetermined range with the photographed images of other adjacent cameras as shown in (a) to (c) of FIG. 10. This is to secure an image which is connected in various directions.

In order to include overlapping areas of the predetermined range with one or more other adjacent cameras, the camera module 130 of each position may be controlled in various elements such as the zoom of the camera 132, the height of the camera 132 and the distance of the camera 132 to the subject TS.

As is apparent from the above descriptions, in the embodiment, the 3D photographing environment of a subject may be easily set, and may be set in an optimal state in correspondence to the characteristics of the subject.

In addition, time and effort required for setting a photographing environment for 3D photographing of the subject may be saved.

While various embodiments have been described above, it will be understood to those skilled in the art that the embodiments described are by way of example only. Accordingly, the disclosure described herein should not be limited based on the described embodiments.

The invention claimed is:

1. A three-dimensional studio system comprising:
a booth including camera modules each including a camera which photographs a subject in response to a camera control signal and a driving device which adjusts a position and a direction of the camera in response to a driving control signal and sensor modules each of which provides a sensing signal obtained by sensing the subject, the camera modules and the sensor modules being disposed by being spatially dispersed around the subject;
a database configured to store camera setting data for controlling the camera and driving setting data for adjusting the position and the direction of the camera, to have a correlation with the sensing signal;
a booth control unit configured to transfer a photographed image of the camera to an external image processing device, select the camera setting data and the driving setting data for the sensing signal of the sensor module in the database, and provide the camera control signal and the driving control signal corresponding to the camera setting data and the driving setting data, to the camera and the driving device, respectively; and
a statistical analysis unit configured to receive the sensing signal and the camera setting data and the driving setting data selected for the sensing signal, from the booth control unit, receive a rendering correction value obtained in a course of performing an image process, from the image processing device, and back up the camera setting data and the driving setting data in the database by reflecting the rendering correction value, to have a correlation with the sensing signal.

2. The three-dimensional studio system according to claim 1, wherein the booth control unit provides the camera control signal and the driving control signal which adjust a zoom of the camera, the position of the camera and the direction of the camera to allow the camera to secure a photographed image including an overlapping area of a predetermined range with one or more other adjacent cameras, to the camera and the driving device, respectively.

3. The three-dimensional studio system according to claim 1, wherein the booth control unit controls at least one of a shutter, an iris, a sensitivity and a zoom of the camera, and controls the zoom of the camera to secure a photographed image including an overlapping area of a predetermined range with one or more other adjacent cameras.

4. The three-dimensional studio system according to claim 1, wherein the driving device mounts the camera, is capable of upward and downward movement, horizontal rotation and vertical rotation, and controls the position and the direction of the camera by being controlled in at least one of the upward and downward movement, the horizontal rotation and the vertical rotation.

5. The three-dimensional studio system according to claim 4,
wherein the booth further includes a first guider on which at least two camera modules are installed and which guides upward and downward movement of the driving device, and
wherein the driving device is constructed to be moved upward and downward along the first guider in response to the driving control signal.

6. The three-dimensional studio system according to claim 4, wherein the driving device comprises:
a first driving part mounting the camera, and performing any one of the horizontal rotation and the vertical rotation in response to the driving control signal;
a second driving part mounting the first driving part, and performing the other of the horizontal rotation and the vertical rotation in response to the driving control signal; and
a third driving part performing the upward and downward movement of the second driving part in response to the driving control signal.

7. The three-dimensional studio system according to claim 6, wherein the second driving part and the third driving part are included in one fourth driving part.

8. The three-dimensional studio system according to claim 1, wherein the booth comprises:
a first guider on which at least two camera modules are separately installed and which guides upward and downward movement of the at least two camera modules;
a second guider guiding horizontal movement; and
a horizontal moving part supporting the first guider, and constructed to be moved in a horizontal direction along the second guider,
wherein the horizontal moving part is moved in response to the driving control signal to adjust a distance between the subject and the camera module.

9. The three-dimensional studio system according to claim 1, wherein the sensor module comprises at least one of:
a shape recognition sensor configured to recognize a shape of the subject;
a position recognition sensor configured to recognize a position of the subject;
a space recognition sensor configured to recognize a distance of the subject;

a first photo sensor configured to sense black and white of
the subject; and a first color sensor configured to recognize a color of the
subject, wherein the sensing signal includes outputs of the shape
recognition sensor, the position recognition sensor, the
space recognition sensor, the first photo sensor and the
first color sensor.

10. The three-dimensional studio system according to
claim 9, wherein the space recognition sensor is configured
by using a laser sensor.

11. The three-dimensional studio system according to
claim 9, wherein the sensor module further comprises:

a second photo sensor configured to sense black and white
of a background of the subject; and a second color sensor configured to recognize a color of
the background of the subject, wherein the sensing signal includes outputs of the shape
recognition sensor, the position recognition sensor, the
space recognition sensor, the first photo sensor, the
second photo sensor, the first color sensor and the
second color sensor.

12. The three-dimensional studio system according to
claim 11, wherein the first photo sensor and the second photo
sensor are configured by using one photo sensor, and wherein the first color sensor and the second color sensor
are configured by using one color sensor.

13. The three-dimensional studio system according to
claim 1, wherein the camera modules are disposed by being
spatially dispersed to form a cylindrical space around the
subject.

14. The three-dimensional studio system according to
claim 1, wherein the camera modules are disposed by being
spatially dispersed to form a dome-shaped space around the
subject.

15. The three-dimensional studio system according to
claim 1, wherein the camera modules are disposed by being
dispersed on at least two disposition lines which are positioned on the same plane around the subject.

16. The three-dimensional studio system according to
claim 1, wherein the camera modules are disposed by being
dispersed on at least two disposition lines which are positioned on different planes around the subject.

17. The three-dimensional studio system according to
claim 1, wherein the booth further includes a background module
which provides a background for the subject, wherein the booth control unit provides a background
control signal corresponding to the sensing signal, to
the booth, and wherein the background module changes the background
to any one of black, white and one or more colors in
response to the background control signal.

18. The three-dimensional studio system according to
claim 17, wherein the background module includes a plurality of background cells, and each background cell selectively represents the background for the camera by changing
light emission to black, white and one or more colors in
response to the background control signal.

19. The three-dimensional studio system according to
claim 17, wherein the background module includes a plurality of background cells, and each background cell
includes screens capable of representing black, white and
one or more colors and selectively represents the background by driving the screens in response to the background
control signal.

20. The three-dimensional studio system according to
claim 19, wherein the background module drives the screens
in any one direction of a vertical direction and a horizontal
direction.

21. The three-dimensional studio system according to
claim 18, wherein the camera module is disposed on a front
surface of the background module.

22. The three-dimensional studio system according to
claim 17, wherein the background module has a space which
disposes at least a portion of the camera module and in
which the camera is capable of photographing the subject.

23. The three-dimensional studio system according to
claim 11, wherein the database stores background control data to
have a correlation with the sensing signal, and wherein the booth control unit selects the background
control data corresponding to the sensing signal, and
provides the background control signal corresponding
to the selected background control data, to the background module.

24. The three-dimensional studio system according to
claim 1, wherein, in order for history management, the
statistical analysis unit backs up the camera setting data and
the driving setting data on which the rendering correction
value is reflected, in the database, separately from the
camera setting data and the driving setting data before
reflecting the rendering correction value, to have a correlation with the same sensing signal.

25. The three-dimensional studio system according to
claim 1, wherein the statistical analysis unit defines the
sensing signal to have a statistical weight for a specific
element included in the sensing signal, and backs up the
camera setting data and the driving setting data, in the
database, to have the correlation with the sensing signal
having a weight.

26. The three-dimensional studio system according to
claim 1, wherein the statistical analysis unit distinguishes
valid and invalid rendering correction values and samples a
valid rendering correction value, samples the camera setting
data and the driving setting data by reflecting the valid
rendering correction value on the camera setting data and the
driving setting data, and backs up the sampled camera
setting data and driving setting data, in the database, to have
the correlation with the sensing signal.

* * * * *